Figure 1:
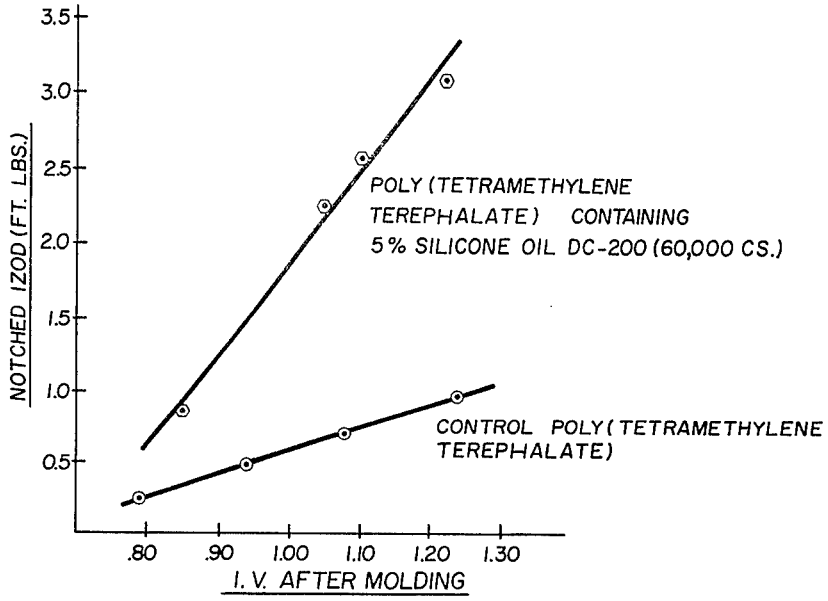
Figure 2:
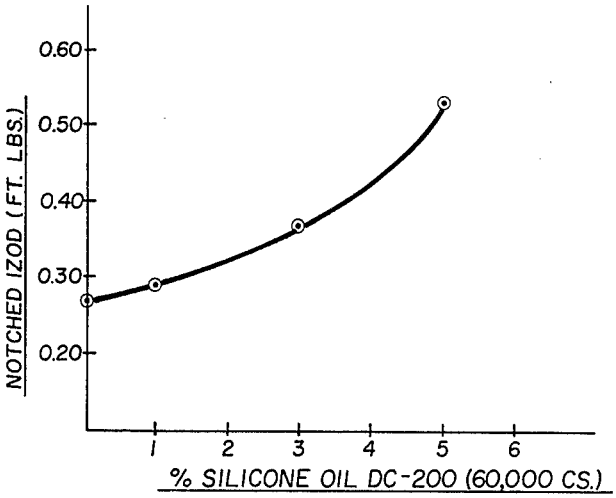
Figure 3:
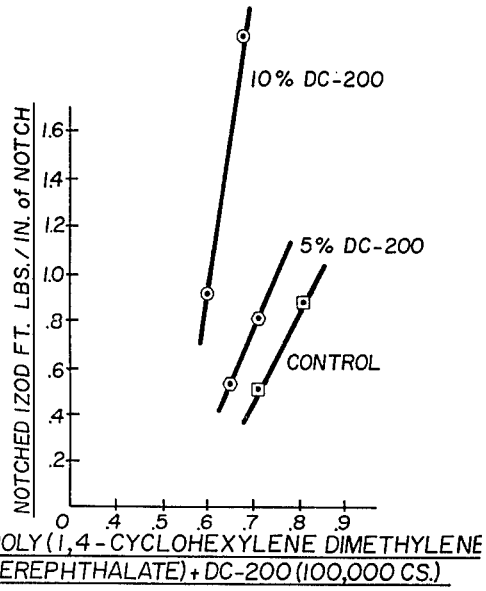

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 5

T941,003

POLYESTER THERMOPLASTIC MOLDABLE COMPOSITIONS CAPABLE OF BEING MOLDED INTO OBJECTS HAVING IMPROVED PHYSICAL PROPERTIES

Thomas G. Davis, 1620 Pineola Ave. 37664, and John G. Thompson, 614 Lazy Lane 37663, both of Kingsport, Tenn.

Filed July 30, 1974, Ser. No. 493,008
Int. Cl. C08g *17/14*
U.S. Cl. 260—75 SB
1 Sheet Drawing. 7 Pages Specification

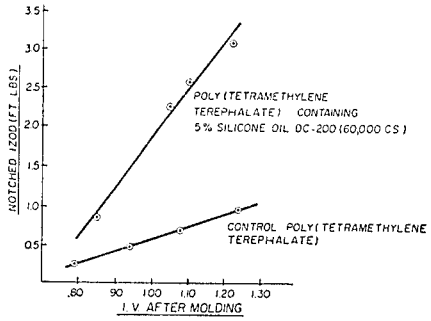

Polyester thermoplastic moldable compositions are provided which can be molded into objects having improved physical properties. The polyester moldable compositions contain at least one polyester thermoplastic material and at least one silicon compound. The silicon compound can be added to the polyester thermoplastic material during preparation of the polyester thermoplastic material or the silicon compound can be added by melt blending to the prepared thermoplastic material. The silicon compound containing polyester thermoplastic composition can be molded into objects which exhibit improved physical properties. One such improved property exhibited by the molded object is an improved Izod impack strength.

POLYESTER THERMOPLASTIC MOLDABLE COMPOSITIONS CAPABLE OF BEING MOLDED INTO OBJECTS HAVING IMPROVED PHYSICAL PROPERTIES

Original Filed July 30, 1974

EFFECT OF SILICONE ADDITIVES ON IMPACT STRENGTH OF POLY (TETRAMETHYLENE TEREPHTHALATE)

EFFECT OF SILICONE ADDITIVES ON IMPACT STRENGTH OF POLY (ETHYLENE TEREPHALATE)